3,370,070
[N-ALKYL-17-(DIALKYLAMINOALKYL)AMINO] ANDROST-4-EN-3-ONES

Paul D. Klimstra, Northbrook, Ill., and Raymond E. Counsell, Ann Arbor, Mich., assignors to G. D. Searle & Co., Chicago, Ill., a corporation of Delaware
No Drawing. Filed June 16, 1965, Ser. No. 464,553
7 Claims. (Cl. 260—397.3)

The present invention relates to novel steroidal di-amino-ketones and to compounds derived therefrom and, more particularly, to [N-alkyl-17-(dialkylaminoalkyl)-amino]androst-4-en-3-ones and derivatives thereof which can be represented by the following structural formula

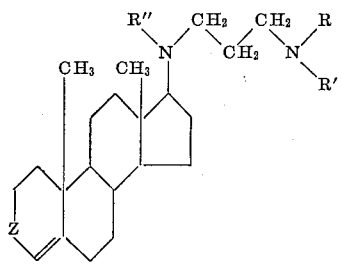

wherein Z can be a carbonyl, β-hydroxymethylene or β-(lower alkanoyl)oxymethylene radical and R, R' and R'' are lower alkyl radicals.

Especially preferred compounds of this invention are those within the scope of the following formula

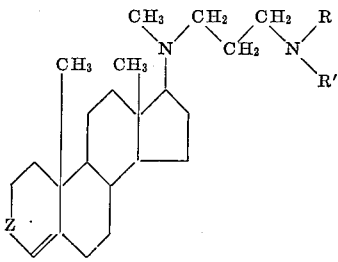

wherein R, R' and Z are as hereinbefore defined.

The lower alkyl radicals denoted in the foregoing representation are exemplified by methyl, ethyl, propyl, butyl, pentyl, hexyl, heptyl and the branched-chain isomers thereof. Typical of the lower alkanoyl radicals depicted therein are formyl, acetyl, propionyl, butyryl, valeryl, caproyl, heptanoyl and the branched-chain radicals isomeric therewith.

The compounds of the present invention are conveniently manufactured by utilizing as starting materials the compounds encompassed by the following structural formula

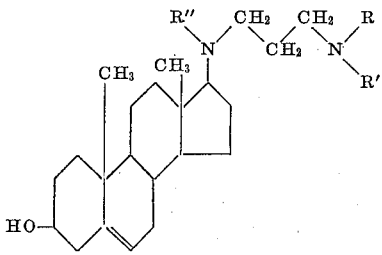

wherein R, R' and R'', as hereinbefore specified, are lower alkyl radicals. When the latter substances are contacted with a suitable oxidizing agent, the corresponding substituted androst-4-en-3-ones are produced. As a specific example, [N - methyl - 17β - (3 - dimethylaminopropyl) amino]androst-5-en-3β-ol is heated with aluminum isopropoxide and cyclohexanone in toluene to yield [N-methyl-17β-(3-dimethylaminopropyl)amino]androst - 4 - en-3-one.

The 3-hydroxy compounds of this invention can be obtained by reduction of the corresponding 3-keto compounds. The aforementioned [N-methyl-17β-(3-dimethylaminopropyl)amino]androst-4-en-3-one, as a specific illustration, is allowed to react with lithium aluminum hydride in dioxane at room temperature, thus producing [N-methyl - 17β - (3 - dimethylaminropropyl)amino]androst-4-en-3β-ol.

The lower alkanoate esters of the present invention are obtained by reaction of the corresponding 3-hydroxy compounds with a lower alkanoic acid anhydride or halide, preferably in the presence of a suitable acid acceptor. [N-methyl-17β-(3 - dimethylaminopropyl)amino] androst-4-en-3β-ol, typically, is allowed to react with acetic anhydride in pyridine to afford [N-methyl-17β-(3-dimethylaminopropyl)amino]androst - 4 - en-3β-ol 3-acetate.

The compounds of the present invention exhibit valuable pharmacological properties. They are hypocholesterolemic agents, for example, as is evidenced by their ability to effect a reduction in blood plasma cholesterol level. In addition, they possess antibacterial, anti-protozoal and anti-algal properties in view of their ability to inhibit the growth of *Diplococcus pneumoniae*, *Tetrahymena gelleii* and *Chlorella vulgaris*. They inhibit also the germination of monocotyledenous and dicotyledenous seeds.

The invention will appear more fully from the examples which follow. These examples are given by way of illustration only, however, and are not to be construed as limiting the invention either in spirit or in scope as many modifications both in materials and in methods will be apparent from this disclosure to those skilled in the art. In these examples, temperatures are given in degrees centigrade (° C.) and quantities of materials in parts by weight unless otherwise noted.

Example 1

A solution of 4 parts of [N-methyl-17β-(dimethylaminopropyl)amino]androst-5-en-3β-ol in 19 parts of cyclohexanone containing 87 parts of toluene is distilled until anhydrous. To that dried solution is then added 8 parts of aluminum isopropoxide in 65 parts of toluene dropwise over a period of about 30 minutes. The resulting solution is heated at the reflux temperature for about 2½ hours, then is allowed to stand at room temperature for about 16 hours. Approximately 140 parts by volume of saturated aqueous sodium potassium tartrate is added, and the resulting mixture is steam distilled for approximately 1½ hours. The residual aqueous mixture is cooled, then is extracted with ether. The ether layer is separated, then extracted several times with dilute hydrochloric acid. The acidic layer is washed with ether, then made alkaline by the addition of 20% aqueous sodium hydroxide. The oily solid material which separates is extracted with ether, and the ether layer is washed with water. Removal of the solvent by distillation under reduced pressure affords an oil which solidifies upon standing and cooling. This compound, [N-methyl-17β-(dimethylaminopropyl)amino]androst - 4 - en-3-one, exhibits an optical rotation of +70.5° in chloroform and also an ultraviolet absorption maximum at about 240 millimicrons with a molecular extinction coefficient of 15,500. This substance can be represented by the following structural formula

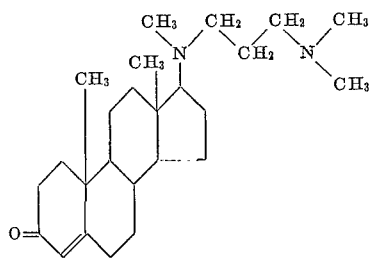

The latter free base is dissolved in ether, and an excess of isopropanolic hydrogen chloride is added. The resulting precipitate is isolated by filtration and dried to afford the dihydrochloride salt.

*Example 2*

To a slurry of 7 parts of lithium aluminum hydride in 300 parts of dioxane is added a solution of 17 parts of [N - methyl - 17β - (3 - dimethylaminopropyl)amino]-androst-4-en-3-one in 300 parts of dioxane. The resulting reaction mixture is stirred at room temperature for about 2½ hours, then is cooled and a solution containing 7 parts of water and 88 parts of tetrahydrofuran is added dropwise with stirring. Following that addition, there is added dropwise a solution of 5 parts by volume of 20% aqueous sodium hydroxide in 250 parts of water. The resulting precipitated salts are removed by filtration and are washed on the filter with dioxane. The filtrate is evaporated to dryness to afford an oil which solidifies on standing. Recrystallization of that crude material from acetone results in [N - methyl-17β-(3-dimethylaminopropyl)amino]androst-4-en-3β-ol, melting at about 110–113°. This compound exhibits also an optical rotation of +46° in chloroform and can be represented by the following structural formula

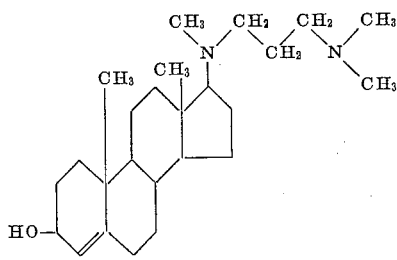

The latter free base is dissolved in ether and the resulting solution is made acidic by the addition of excess isopropanolic hydrogen chloride, and the resulting precipitated salt is collected by filtration and dried to afford the corresponding dihydrochloride.

*Example 3*

By substituting an equivalent quantity of [N-methyl-17β - (3 - diethylaminopropyl)amino]androst - 5 - en-3β-ol and otherwise proceeding according to the processes described in Example 1, there is obtained [N-methyl-17β-(3-diethylaminopropyl)amino]androst-4-en-3-one.

*Example 4*

The substitution of an equivalent quantity of [N-methyl-17β - (3 - diethylaminopropyl)amino]androst - 4 - en-3-one in the procedure of Example 2 results in [N-methyl - 17β - (3 - diethylaminopropyl)amino]androst-4-en-3β-ol.

*Example 5*

A mixture of 5 parts of [N-methyl-17β-(3-dimethylaminopropyl)amino]androst-4-en-3β-ol, 60 parts of acetic anhydride and 120 parts of pyridine is warmed for a few minutes in order to effect solution, then is allowed to stand at room temperature for about 3 hours. The reaction mixture is poured into cold water containing excess potassium hydroxide, and the resulting alkaline mixture is extracted with chloroform. The chloroform layer is separated, washed several times with water and dried over anhydrous sodium sulfate containing decolorizing carbon. The solvent is removed by distillation under reduced pressure and the resulting glass-like residue is extracted with ether. To the ether extract is added excess isopropanolic hydrogen chloride, and the precipitate which forms is collected by filtration and dried, thus producing [N - methyl - 17β - (3 - dimethylaminopropyl)amino]-androst-4-en-3β-ol 3-acetate dihydrochloride. This compound is characterized by infrared adsorption maxima, in chloroform, at about 3.40, 5.77, 6.02 and 7.98 microns and also by the following structural formula

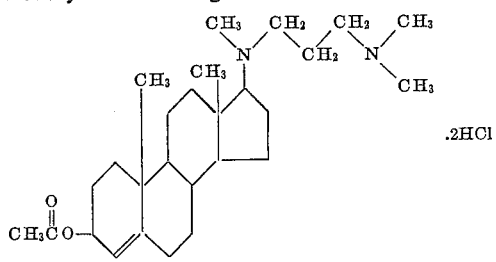

*Example 6*

When an equivalent quantity of propionic anhydride is substituted in the procedure of Example 5, there is obtained [N - methyl - 17β-(3-dimethylaminopropyl)-amino]androst-4-en-3β-ol 3-propionate and also the corresponding dihydrochloride salt.

What is claimed is:

1. A compound of the formula

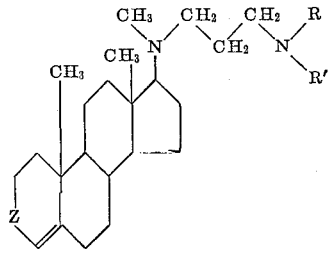

wherein Z is selected from the group consisting of carbonyl, β-hydroxymethylene and β-(lower alkanoyl)oxymethylene radicals, and R and R′ are lower alkyl radicals.

2. A compound of the formula

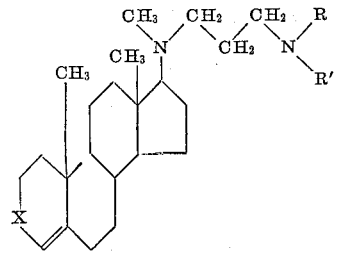

wherein X is selected from the group consisting of carbonyl and β-hydroxymethylene radicals, and R and R′ are lower alkyl radicals.

3. A compound of the formula

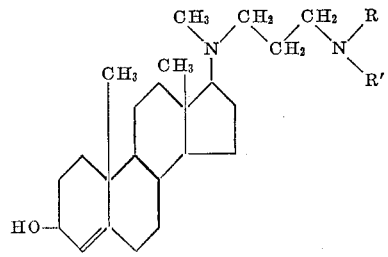

wherein R and R' are lower alkyl radicals.

4. [N - methyl - 17β - (3 - dimethylaminopropyl) amino]androst-4-en-3-one.

5. [N - methyl - 17β - (3 - dimethylaminopropyl)-amino]androst-4-en-3β-ol.

6. [N - methyl - 17β - (3 - dimethylaminopropyl)-amino]androst-4-en-3β-ol dihydrochloride.

7. [N - methyl - 17β - (3 - dimethylaminopropyl)-amino]androst-4-en-3β-ol 3-acetate.

References Cited

UNITED STATES PATENTS 3,284,475  11/1966  Klimstra _____ 260—397.4

LEWIS GOTTS, *Primary Examiner.*

E. G. LOVE, *Assistant Examiner.*

UNITED STATES PATENT OFFICE
CERTIFICATE OF CORRECTION

Patent No. 3,370,070                      February 20, 1968

Paul D. Klimstra et al.

It is certified that error appears in the above identified patent and that said Letters Patent are hereby corrected as shown below:

In the heading to the printed specification, line 3, "-3-ONES" should read -- -3-ONES AND DERIVATIVES THEREOF --.

Signed and sealed this 14th day of October 1969.

(SEAL)
Attest:

Edward M. Fletcher, Jr.                    WILLIAM E. SCHUYLER, JR.
Attesting Officer                             Commissioner of Patents